United States Patent
Strmiska et al.

(10) Patent No.: US 7,397,660 B2
(45) Date of Patent: Jul. 8, 2008

(54) METHOD AND APPARATUS FOR REGULATING AIRFLOW IN A CHASSIS

(75) Inventors: Bernard Strmiska, Round Rock, TX (US); Brandon Brocklesby, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 11/178,530

(22) Filed: Jul. 11, 2005

(65) Prior Publication Data
US 2007/0008699 A1    Jan. 11, 2007

(51) Int. Cl.
G06F 1/20 (2006.01)
(52) U.S. Cl. .................. 361/687; 361/695; 454/184
(58) Field of Classification Search ............... 361/687, 361/694, 695, 719; 454/184
See application file for complete search history.

(56) References Cited

U.S. PATENT DOCUMENTS

| | | | |
|---|---|---|---|
| 4,399,485 A | 8/1983 | Wright et al. | |
| 5,793,610 A * | 8/1998 | Schmitt et al. | 361/695 |
| 6,005,770 A * | 12/1999 | Schmitt | 361/695 |
| 6,013,717 A * | 1/2000 | Maris et al. | 524/505 |
| 6,042,348 A * | 3/2000 | Aakalu et al. | 417/423.5 |
| 6,115,250 A * | 9/2000 | Schmitt | 361/695 |
| 6,174,232 B1 * | 1/2001 | Stoll et al. | 454/184 |
| 6,181,557 B1 * | 1/2001 | Gatti | 361/695 |
| 6,213,819 B1 * | 4/2001 | Fan | 439/894 |
| 6,280,319 B1 * | 8/2001 | Wong et al. | 454/184 |
| 6,285,547 B1 * | 9/2001 | Vigeant et al. | 361/695 |
| 6,288,897 B1 * | 9/2001 | Fritschle et al. | 361/687 |
| 6,304,442 B1 * | 10/2001 | Tucker et al. | 361/695 |
| 6,317,320 B1 * | 11/2001 | Cosley et al. | 361/695 |
| 6,373,698 B1 * | 4/2002 | Christensen | 361/695 |
| 6,556,437 B1 * | 4/2003 | Hardin | 361/687 |
| 6,556,438 B1 | 4/2003 | Bolognia et al. | |
| 6,592,449 B2 * | 7/2003 | Cipolla et al. | 454/184 |
| 6,744,632 B2 | 6/2004 | Wilson et al. | |
| 7,054,155 B1 * | 5/2006 | Mease et al. | 361/695 |
| 7,236,361 B2 * | 6/2007 | Cote et al. | 361/695 |
| 2003/0011985 A1 * | 1/2003 | Jensen et al. | 361/687 |
| 2004/0130872 A1 * | 7/2004 | Cravens et al. | 361/695 |
| 2005/0237712 A1 * | 10/2005 | Li | 361/687 |

* cited by examiner

*Primary Examiner*—Lisa Lea-Edmonds
(74) *Attorney, Agent, or Firm*—Haynes and Boone, LLP

(57) ABSTRACT

An airflow regulating apparatus includes a support frame for coupling to a chassis adjacent a heat producing component connector, the support frame defining a regulator channel, and also including an airflow regulator moveably coupled to the support frame and operable to be positioned in the regulator channel. A board including a heat producing component may be provided and the support frame coupled to the board, whereby the airflow regulator will move out of the regulator channel to allow airflow through the regulator channel and past the heat producing component. The heat producing component may then be removed, whereby the airflow regulator will move into the regulator channel to prevent airflow through the regulator channel.

22 Claims, 19 Drawing Sheets

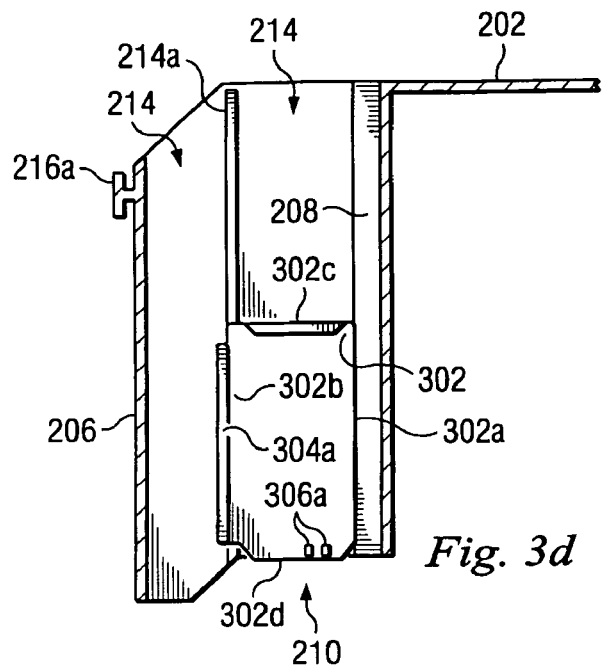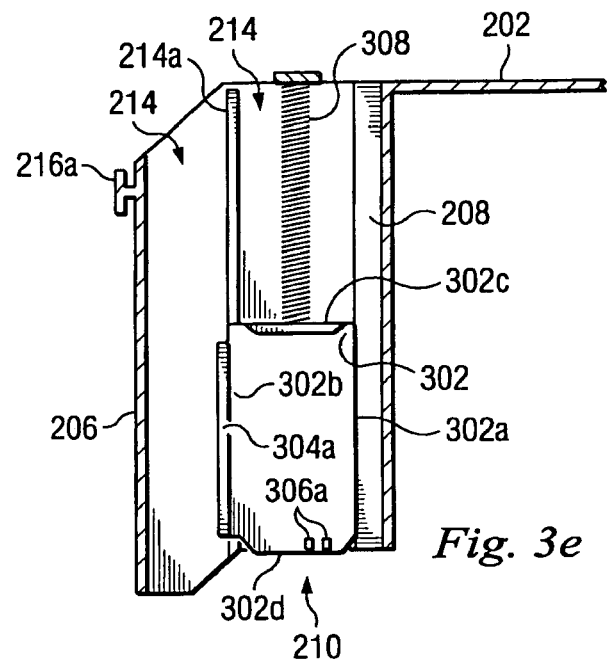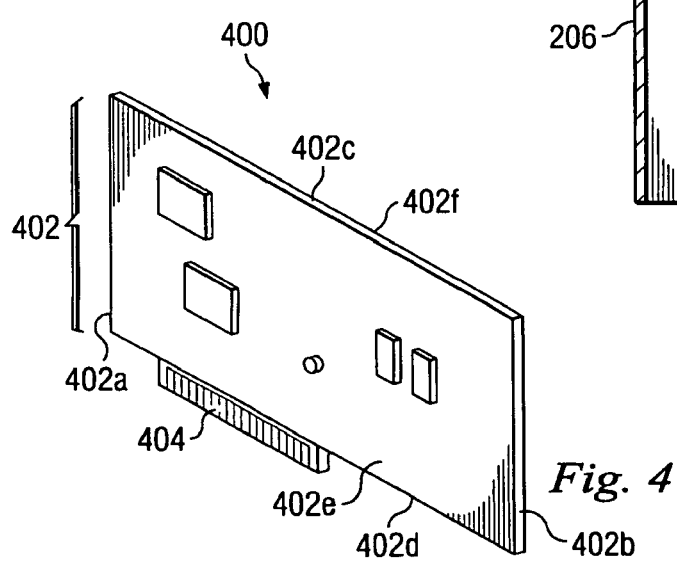

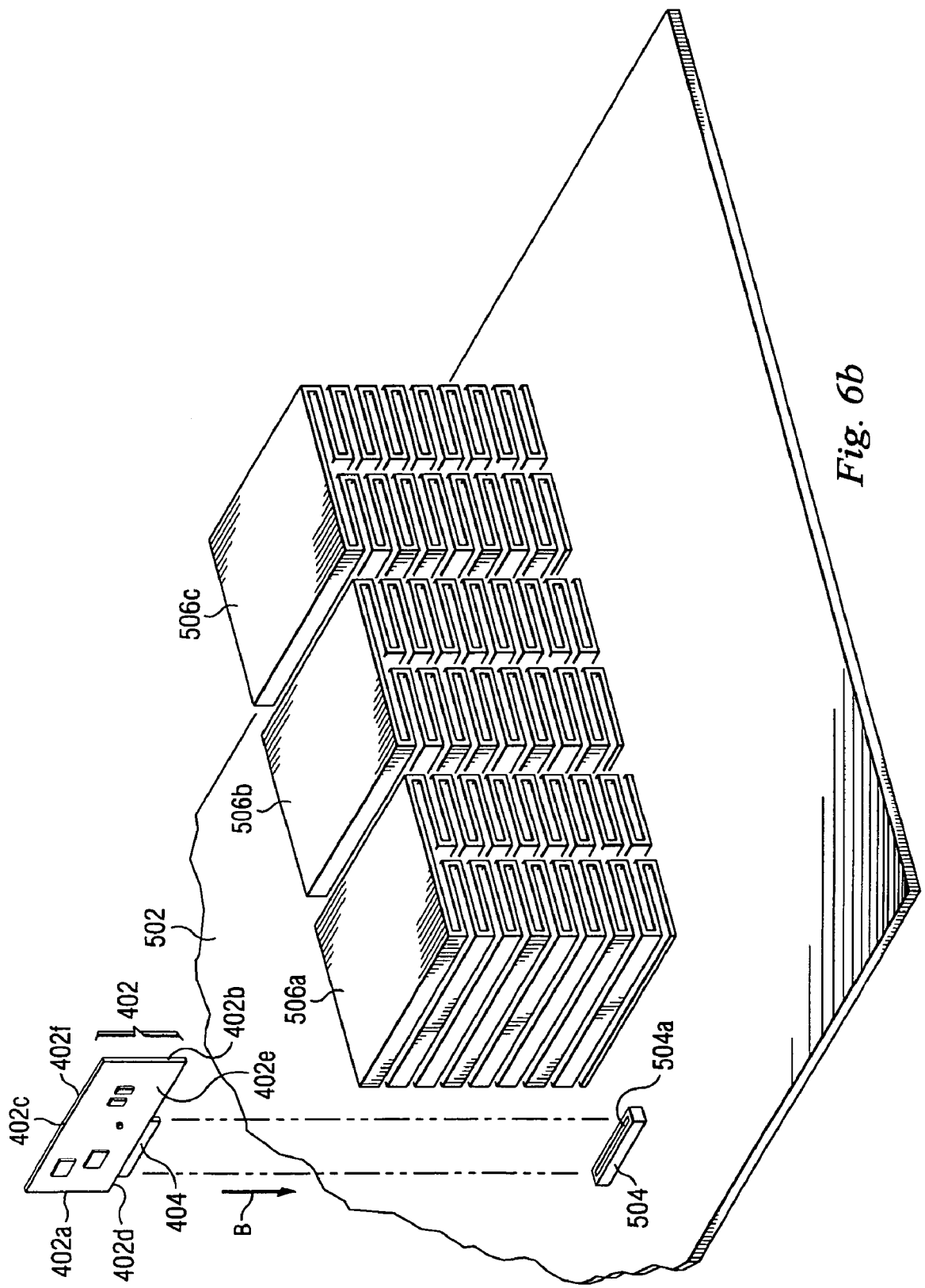

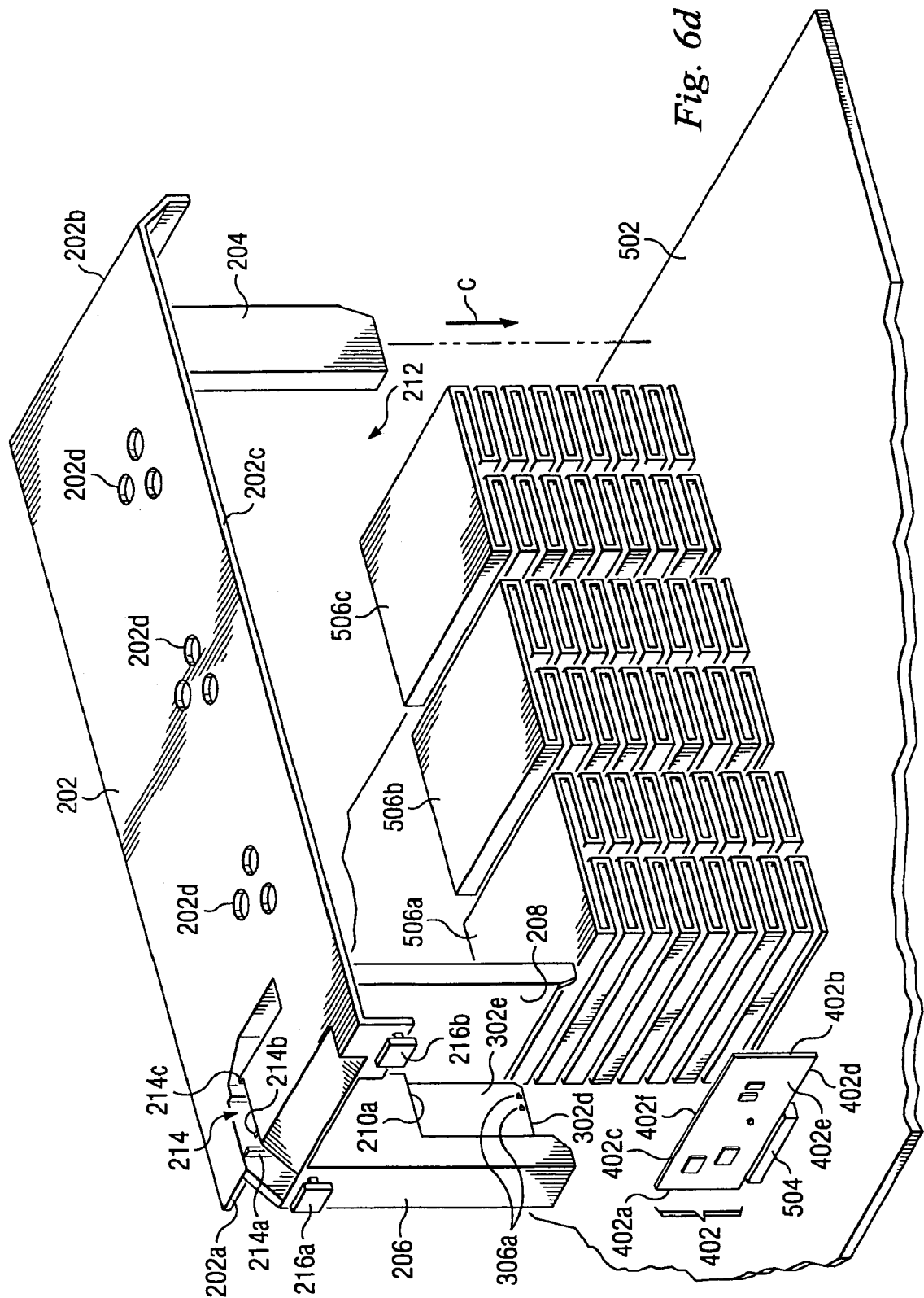

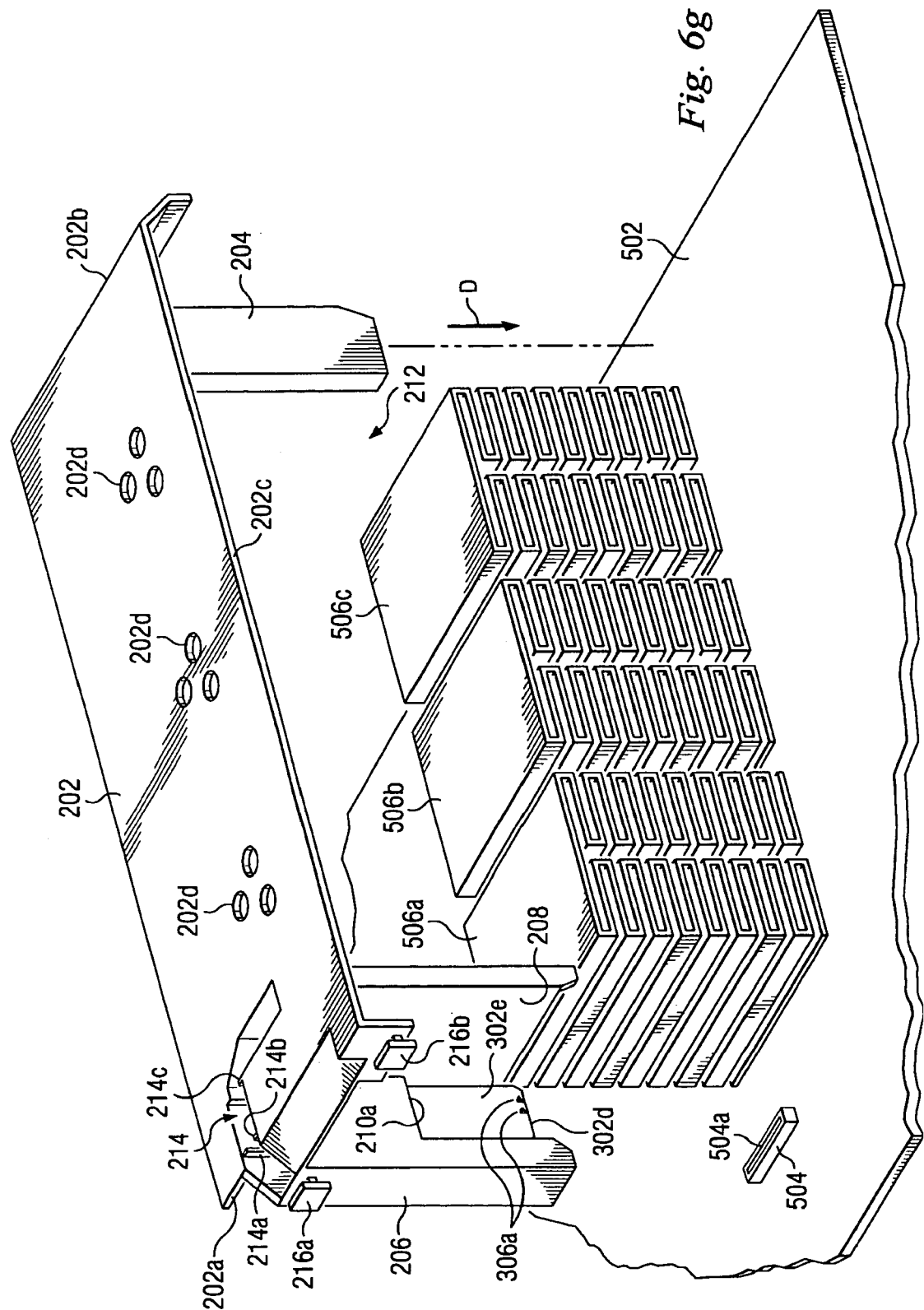

METHOD AND APPARATUS FOR REGULATING AIRFLOW IN A CHASSIS

BACKGROUND

The present disclosure relates generally to information handling systems, and more particularly to regulating airflow in an information handling system chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a chassis which houses a variety of heat producing components. As these heat producing components provide various functions of the information handling system, they heat up, which can affect their performance and the performance of other components of the information handling system. The cooling of these components raises a number of issues.

Conventional cooling solutions for information handling systems generally include at least one fan which either draws or pushes air past the heat producing component in order to cool it off. However, because information handling systems are designed to allow the addition or removal of components in the information handling system chassis, some information handling systems may include spaces in the chassis where there are no heat producing components. In order to optimize the airflow from the fans through the information handling system chassis, blanks are then installed in those spaces in the chassis which have no heat producing components, such that substantially all of the airflow from the fan will be moving over hot heat producing components rather than through empty spaces in the information handling system chassis.

However, when a heat producing component is added to the information handling system, the blank must be manually removed and then is generally disposed of. If that heat producing component is then later removed, either a new blank must be found and manually reinstalled in the information handling system chassis, or else the information handling system risks being damaged due to the lack of a blank in the information handling system chassis and a less than optimal airflow over the hot heat producing components in the information handling system chassis.

Accordingly, it would be desirable to provide for regulating airflow in a chassis absent the disadvantages found in the prior methods discussed above.

SUMMARY

According to one embodiment, an airflow regulating apparatus is provided which includes a support frame for coupling to a chassis adjacent a heat producing component connector, the support frame defining a regulator channel, and also includes an airflow regulator moveably coupled to the support frame and operable to be positioned in the regulator channel.

BRIEF DESCRIPTION OF THE DRAWINGS

FIG. 2b is a perspective view illustrating an embodiment of the support frame of FIG. 2a.

FIG. 2c is a top view illustrating an embodiment of the support frame of FIG. 2a.

FIG. 2d is a cross sectional view illustrating an embodiment of the support frame of FIG. 2a.

FIG. 3a is a perspective view illustrating an embodiment of an airflow regulator used with the support frame of FIG. 2a.

FIG. 3b is a perspective view illustrating an embodiment of the airflow regulator of FIG. 3a.

FIG. 3c is a perspective view illustrating an embodiment of the airflow regulator of FIG. 3a being coupled to the support frame of FIG. 2a.

FIG. 3d is a cross sectional view illustrating an embodiment of the airflow regulator of FIG. 3a coupled to the support frame of FIG. 2a.

FIG. 3e is a cross sectional view illustrating an embodiment of the airflow regulator of FIG. 3a coupled to the support frame of FIG. 2a and biased into a regulator channel.

FIG. 4 is a perspective view illustrating an embodiment of a heat producing component used with the support frame and airflow regulator of FIG. 3d.

FIG. 6b is a perspective view illustrating an embodiment of the heat producing component of FIG. 4 being coupled to the board of FIG. 5b.

FIG. 6d is a perspective view illustrating an embodiment of the support frame and airflow regulator of FIG. 3d being coupled to the board and heat producing of FIG. 6c.

FIG. 6g is a perspective view illustrating an embodiment of the support frame and airflow regulator of FIG. 3d being coupled to the board of FIG. 5b.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
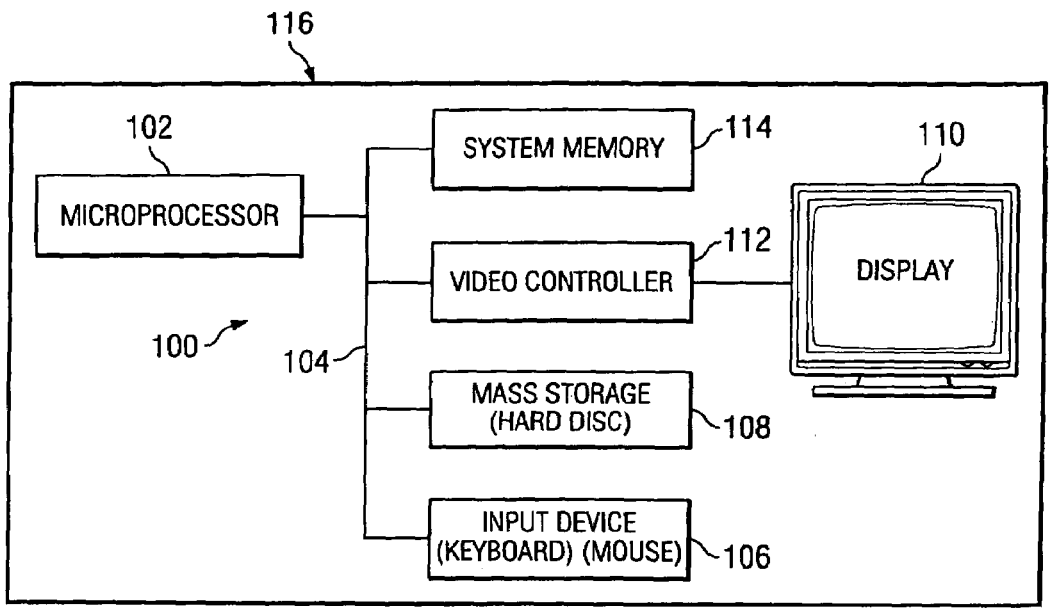
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other busses and intermediate circuits can be deployed between the components described above and microprocessor 102 to facilitate interconnection between the components and the microprocessor.

Referring now to FIGS. 2*a*, 2*b*, 2*c*, and 2*d*, a support frame 200 is illustrated. The support frame 200 includes an elongated base member 202 having a pair of opposing sides 202*a* and 202*b*, a front edge 202*c* extending between the sides 202*a* and 202*b*, and defining a plurality of heat release apertures 202*d* in a spaced apart relationship along the length of the support frame 200. A leg 204 extends from the base member 202 and is located adjacent the side 202*b* of the base member 202. A leg 206 extends from the base member 202, is located adjacent the side 202*a* of the base member 202 and in a substantially parallel and spaced apart relationship from leg 204. A wall 208 extends from the base member 202 and is located adjacent the leg 206 such that the leg 206 and the wall 208 define a regulator channel 210 between the leg 206 and the wall 208. The regulator channel 210 includes a regulator stop edge 210*a* which defines an upper end of the regulator channel 210 extending between the leg 206 and the wall 208. The wall 208, the base member 202, and the leg 204 define a component channel 212 located between them and adjacent the regulator channel 210. The base member 202, the leg 206, and the wall 208 define a regulator passageway 214 extending along the length of the leg 206, through a portion of the base member 202, along a portion of the wall 208, and located above the regulator channel 210. A plurality of regulator couplers 214*a*, 214*b*, and 214*c* extend from the leg 206 and into the regulator passageway 214. The regulator couplers 214*a* and 214*b* are located on opposite sides of the regulator passageway 214 and adjacent an end of the regulator channel 210, and the regulator coupler 214*c* is located adjacent an end of the regulator channel 210 opposite the regulator couplers 214*a* and 214*b*. A chassis coupler 216*a* extends from an upper portion of the leg 206 and adjacent the side 202*a* of the base member 202, and a chassis coupler 216*b* extends from the side 202*a* of the base member 202 in a spaced apart relationship from the chassis coupler 216*a*. In an embodiment, a plurality of chassis couplers substantially similar in design and operation to the chassis couplers 216*a* and 216*b* may be included on the leg 204 and/or the side 202*b* of the base member 202.

Figure 3A:
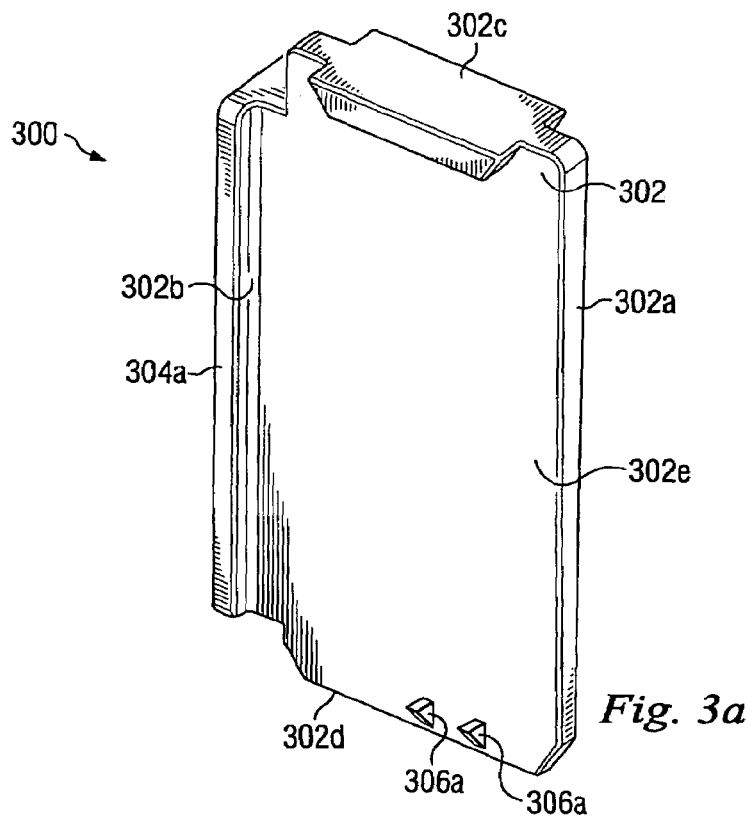
Figure 2A:
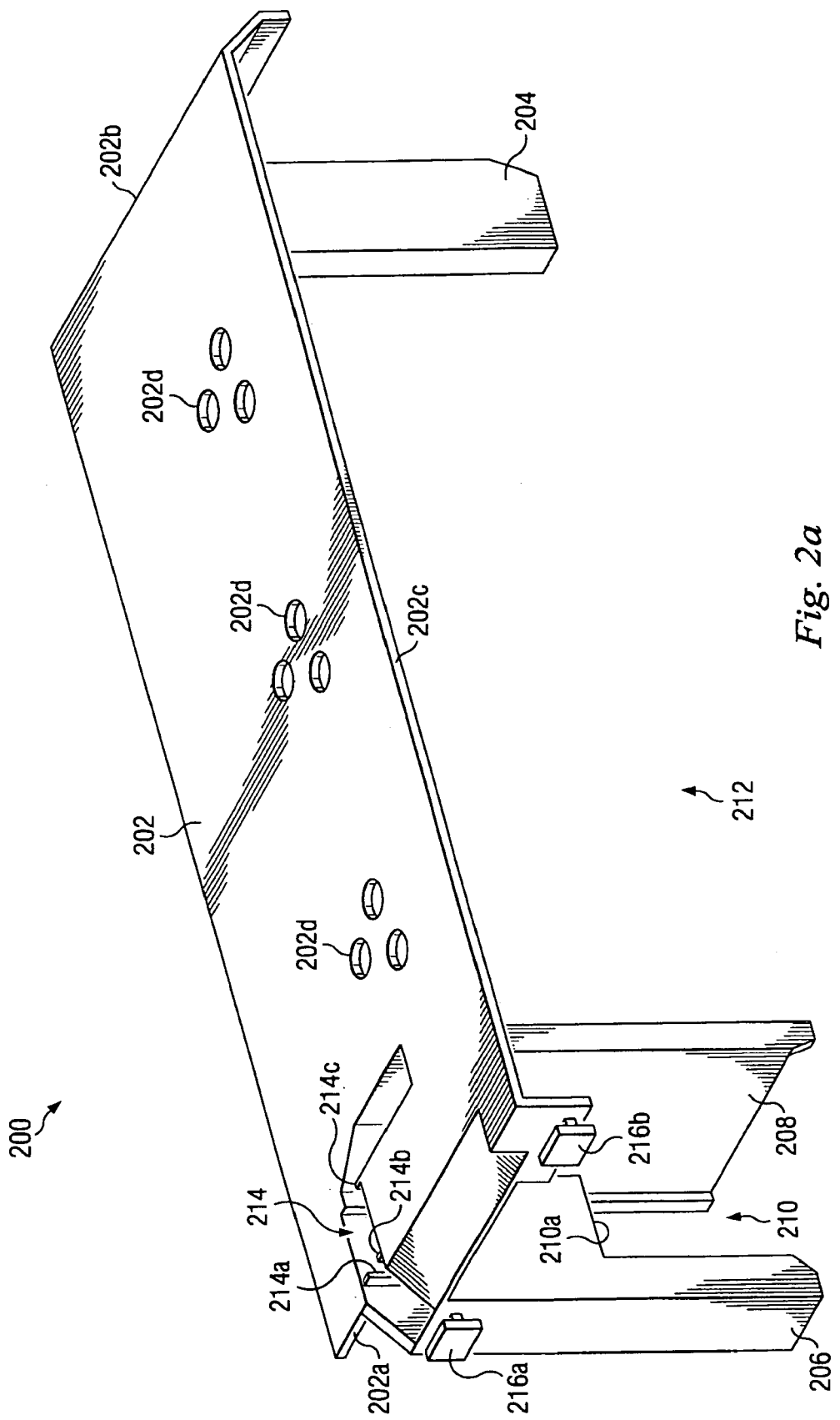
FIG. 2a is a perspective view illustrating an embodiment of a support frame.
Figure 2B:
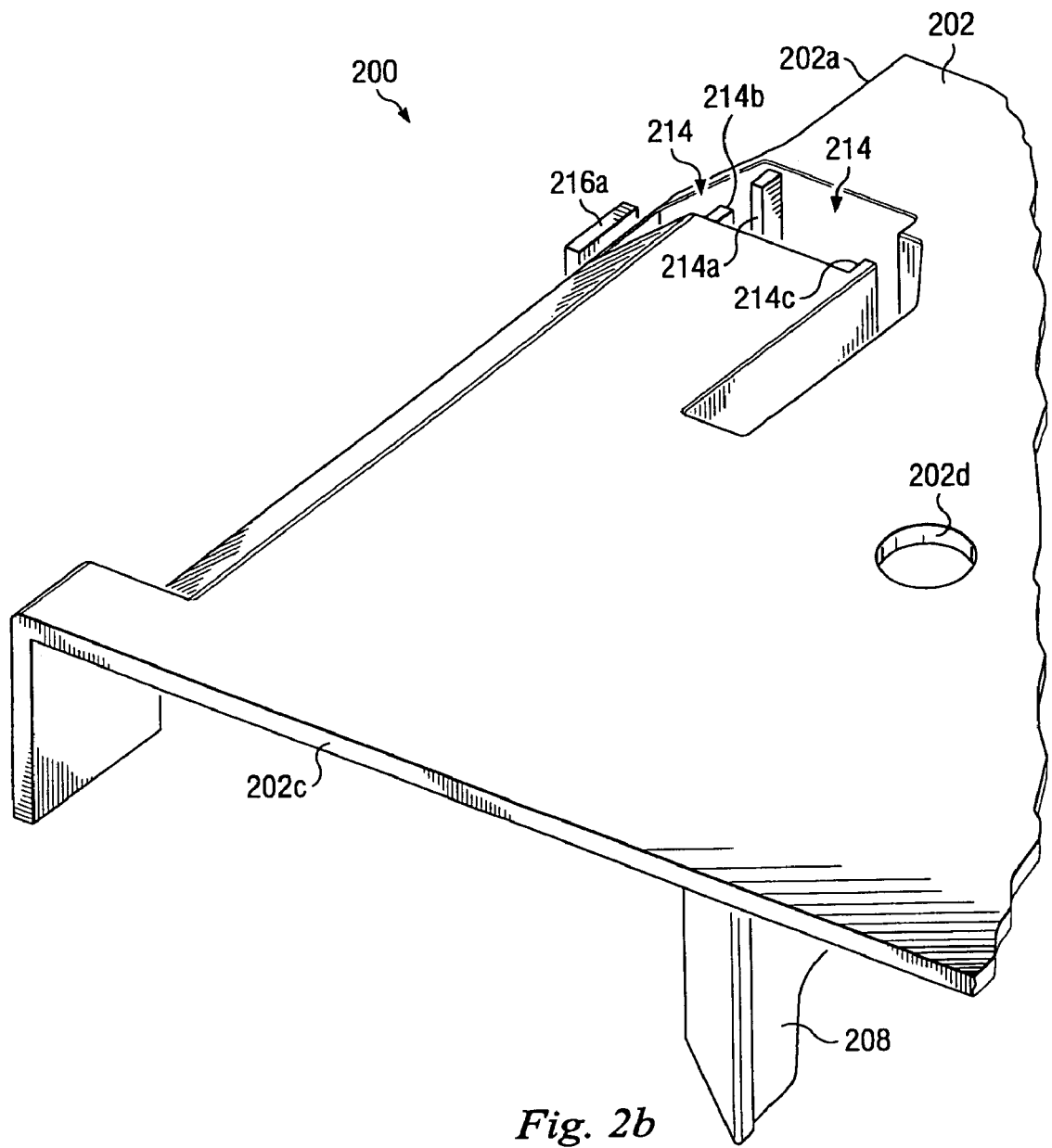
Figure 2C:
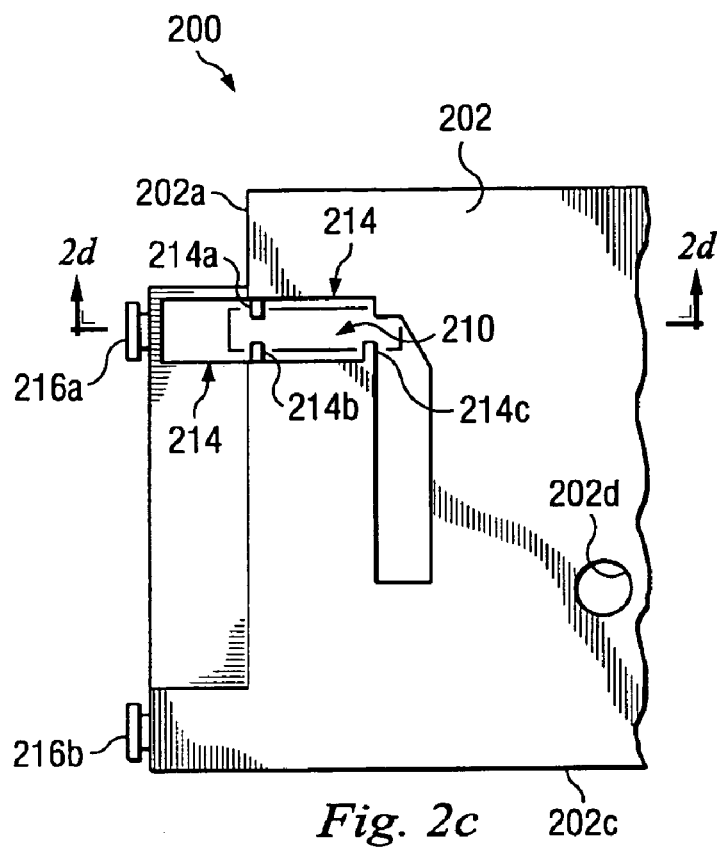
Figure 2D:
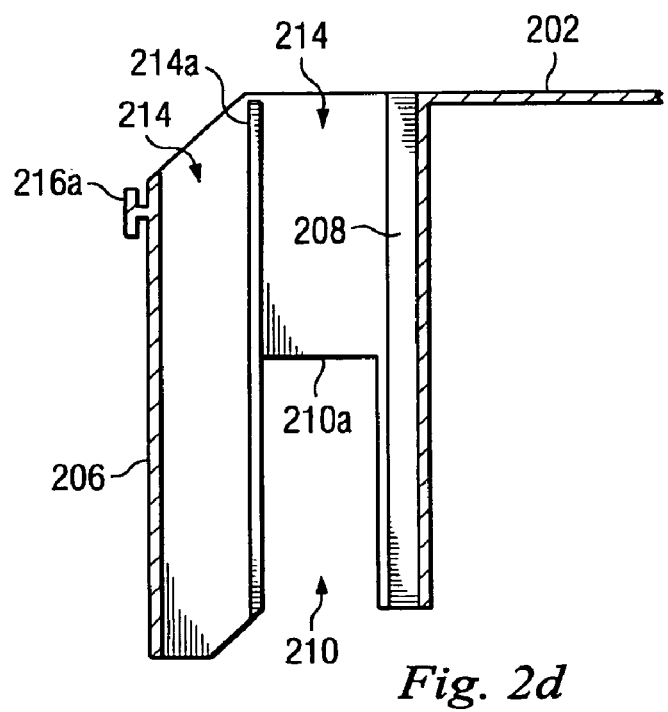
Figure 3B:
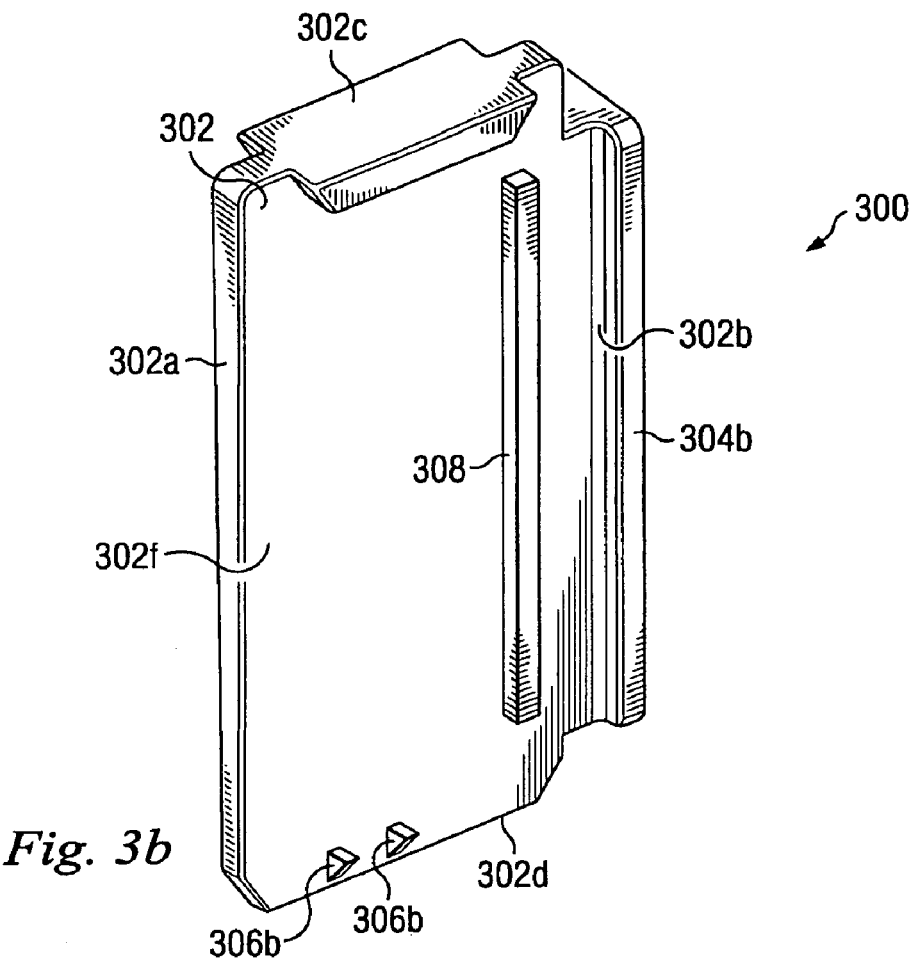

Referring now to FIGS. 3*a* and 3*b*, an airflow regulator 300 is illustrated. The airflow regulator 300 includes a base 302 having a front edge 302*a*, a rear edge 302*b* located opposite the front edge 302*a*, a top edge 302*c* extending between the front edge 302*a* and the rear edge 302*b*, a bottom edge 302*d* extending between the front edge 302*a* and the rear edge 302*b* and located opposite the top edge 302*c*, and a pair of opposing sides 302*e* and 302*f* extending between the front edge 302*a*, the rear edge 302*b*, the top edge 302*c*, and the bottom edge 302*d*. A regulator guide 304*a* extends from the side 302*e* of the base 302, adjacent to and along the length of the rear end 302*b* of the base 302. A regulator guide 304*b* extends from the side 302*f* of the base 302, adjacent to and along the length of the rear end 302*b* of the base 302. A plurality of regulator securing members 306*a* extend from the side 302*e* of the base 302 and are located adjacent the bottom edge 302*d* of the base member 302. A plurality of regulator securing members 306*b* extend from the side 302*f* of the base 302 and are located adjacent the bottom edge 302*d* of the base member 302. A regulator guide 308 extends from the side 302*f* of the base member 302 in a substantially parallel and spaced apart relationship from the regulator guide 304*b* and along the length of the base member 302.

Figure 3C:
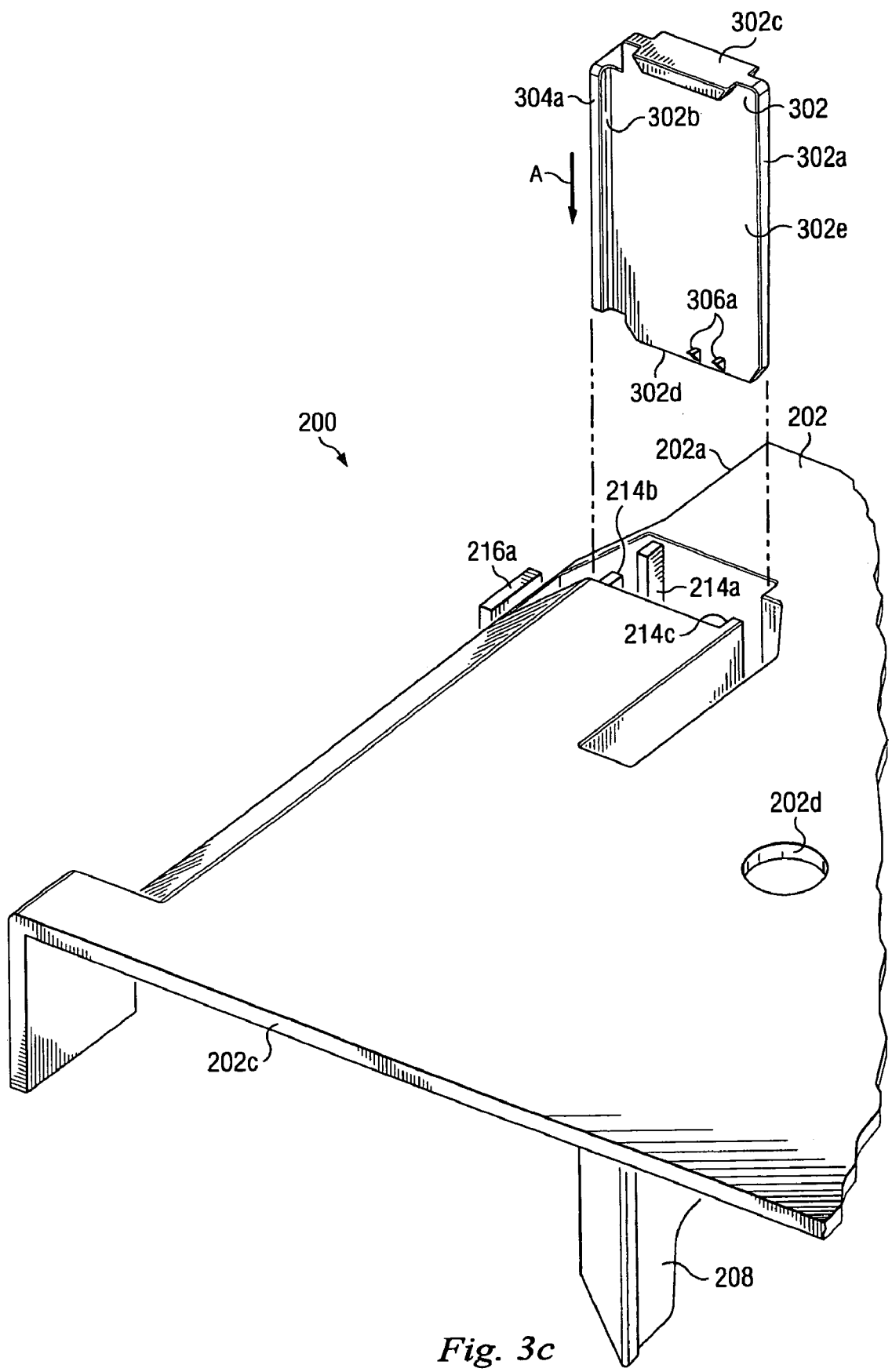

Referring now to FIGS. 2*d*, 3*a*, 3*b*, 3*c*, 3*d*, and 3*e*, in assembly, the airflow regulator 300 is coupled to the support frame 200. The airflow regulator 300 is positioned above the regulator passageway 214 on support frame 200 and moved in a direction A, as illustrated in FIG. 3*c*. As the airflow regulator 300 enters the regulator passageway 214, the regulator coupler 214*a* becomes positioned between the regulator guides 304*b* and 308; the regulator coupler 214*b* becomes positioned adjacent the regulator guide 304*a*; and the front edge 302*a* becomes positioned adjacent the regulator guide 214*c*, resulting in the coupling of the airflow regulator to the support frame and adjacent the regulator channel 210. In an embodiment, the airflow regulator 300 is biased into the regulator channel 210 by gravity, as illustrated in FIG. 3*d*. With the airflow regulator 300 in the regulator channel 210, the regulator securing members 306a and 306b operate to prevent the airflow regulator 300 from being decoupled from the support frame 200 by engaging the regulator stop edge 210a when the airflow regulator 300 is moved from the regulator channel 210 to the regulator passageway 214. In an embodiment, illustrated in FIG. 3e, the airflow regulator 300 may be coupled to the support frame 200 in substantially the same manner as described above, with the provision of a resilient member 308 such as, for example, a spring, between the airflow regulator 300 and the support frame 200 which biases the airflow regulator 300 into the regulator channel 210. The embodiment illustrated in FIG. 3e allows the support frame 200 to be used in a variety of orientations while still biasing the airflow regulator 300 into the regulator channel 210. In an alternative embodiment, the airflow regulator 300 may be coupled to the support frame 200 in a variety of different manners known in the art such as, for example, pivotally connected.

Referring now to FIG. 4, a heat producing component 400 is illustrated. Heat producing component 400 includes a base 402 having a front edge 402a, a rear edge 402b located opposite the front edge 402a, a top edge 402c extending between the front edge 402a and the rear edge 402b, a bottom edge 402d extending between the front edge 402a and the rear edge 402b and located opposite the top edge 402c, and a pair of opposing sides 402e and 402f extending between the front edge 402a, the rear edge 402b, the top edge 402c, and the bottom edge 402d. A connector coupler 404 extends from the bottom edge 402d of the base member 402 and is located adjacent the front edge 402a. In an embodiment, the heat producing component 400 may be an expansion card, a Dual Inline Memory Module (DIMM), a Voltage Regulator Module (VRM), a heat sink coupled to a heat producing component, and/or a variety of other heat producing components known in the art.

Figure 5A:
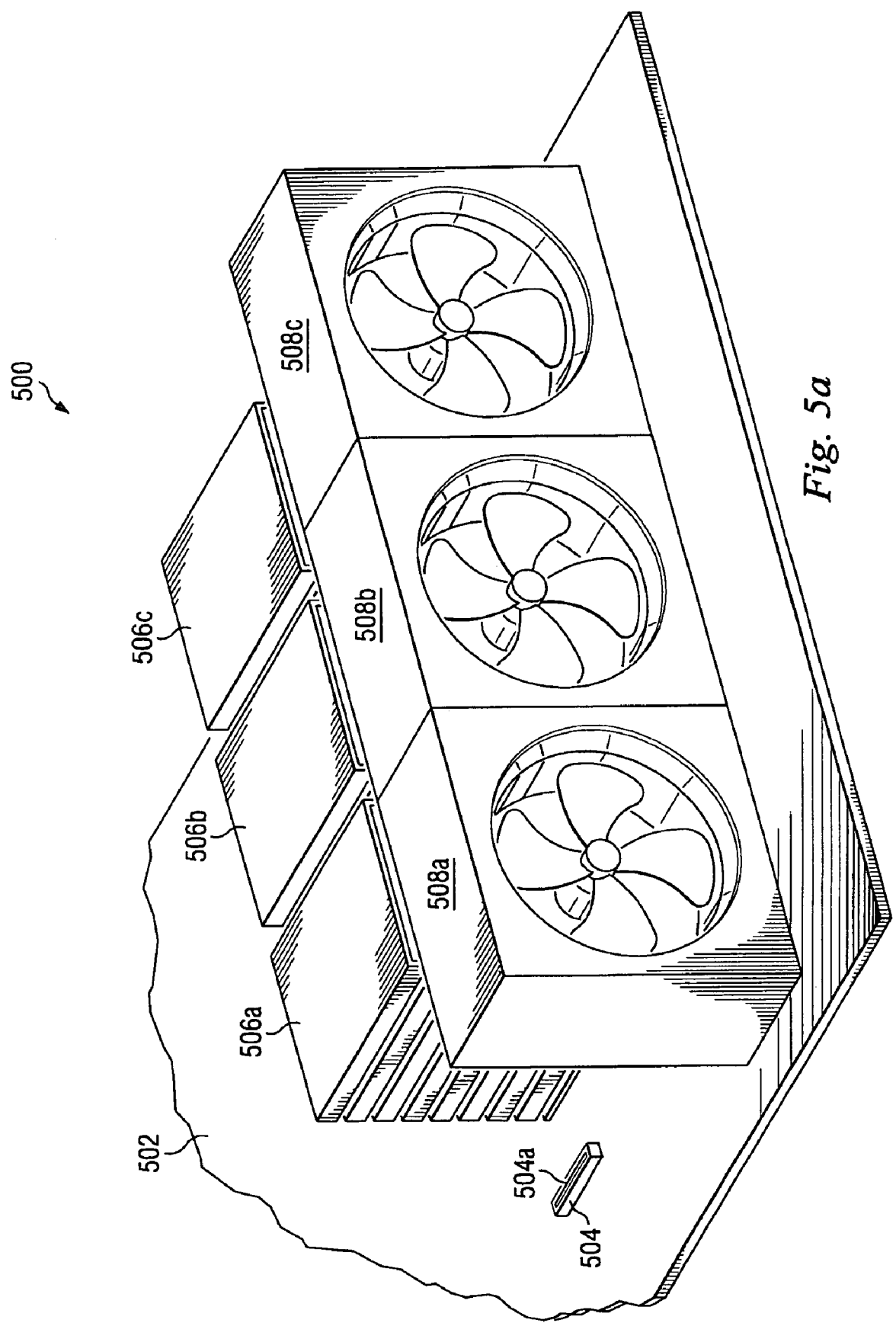
FIG. 5a is a perspective view illustrating an embodiment of a board used with the support frame and airflow regulator of FIG. 3d and the heat producing component of FIG. 4.
Figure 5B:
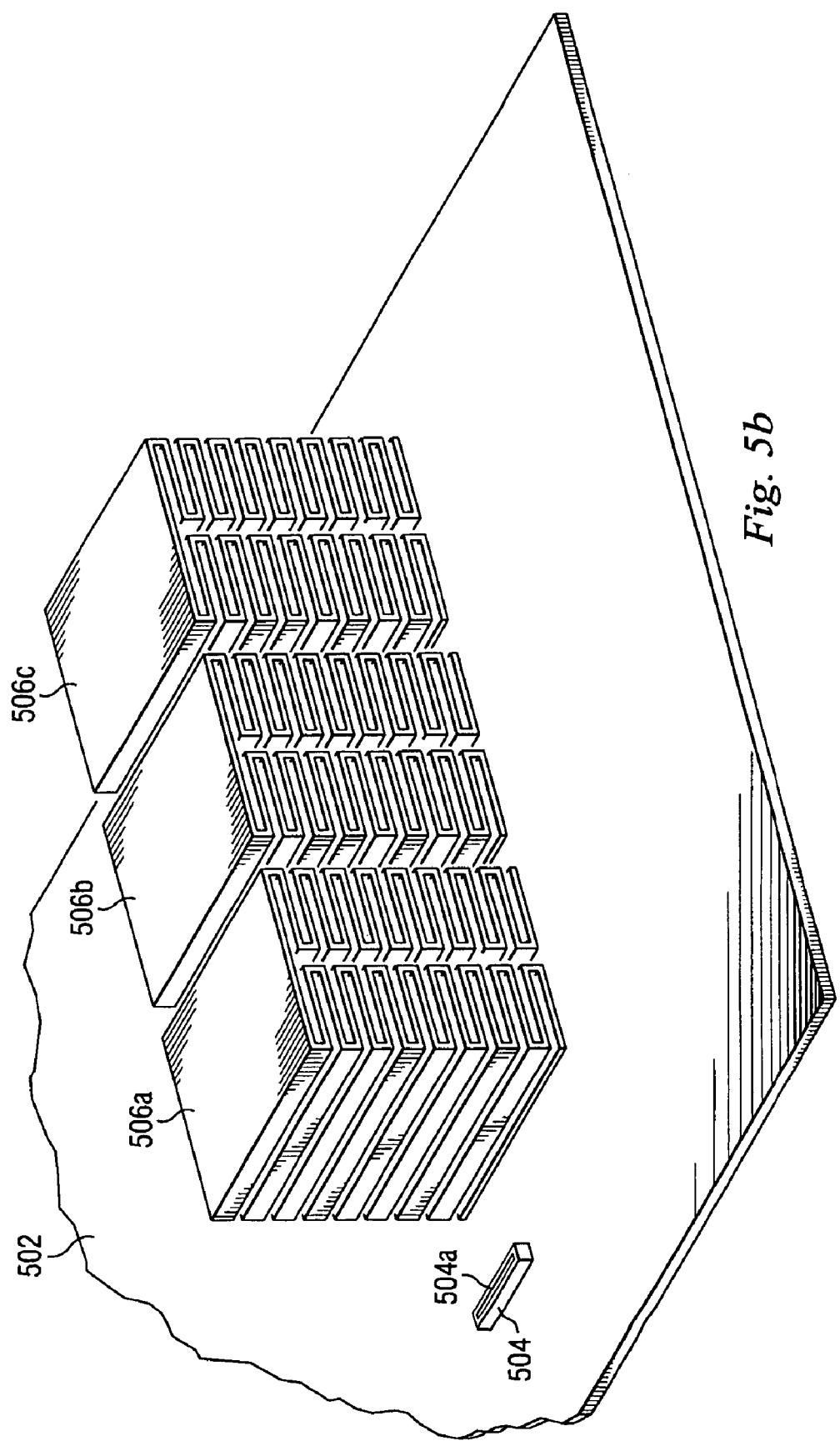
FIG. 5b is a perspective view illustrating an embodiment of the board of FIG. 5a with the fan modules removed for clarity.

Referring now to FIGS. 5a and 5b, a board 500 is illustrated. Board 500 includes a base 502 which may be mounted to a chassis such as, for example, the chassis 116 described above with reference to FIG. 1, and may include components of an information handling system such as, for example, the information handling system 100 described above with reference to FIG. 1. The base 502 includes a heat producing component connector 504 which is mounted to the base 502 and defines a connector slot 504a along its length. A plurality of heat dissipation components 506a, 506b, and 506c are coupled to the base 502 and positioned adjacent the heat producing component connector 504. In an embodiment, the heat dissipation components 506a, 506b, and 506c are coupled to heat producing components such as, for example, the microprocessor 102 described above with reference to FIG. 1, which are mounted to the base 502. A plurality of fan modules 508a, 508b, and 508c are coupled to the board 502 and positioned adjacent the heat dissipation components 506a, 506b, and 506c and the heat producing component connector 504. The board 500 illustrated in FIG. 5b has the fan modules 508a, 508b, and 508c removed for clarity.

Figure 6A:
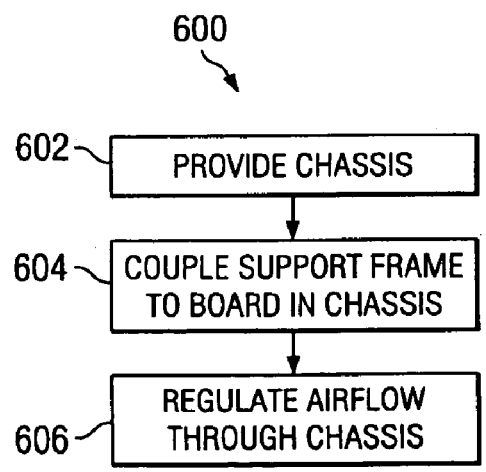
FIG. 6a is a flow chart illustrating an embodiment of a method for regulating airflow in a chassis.
Figure 6C:
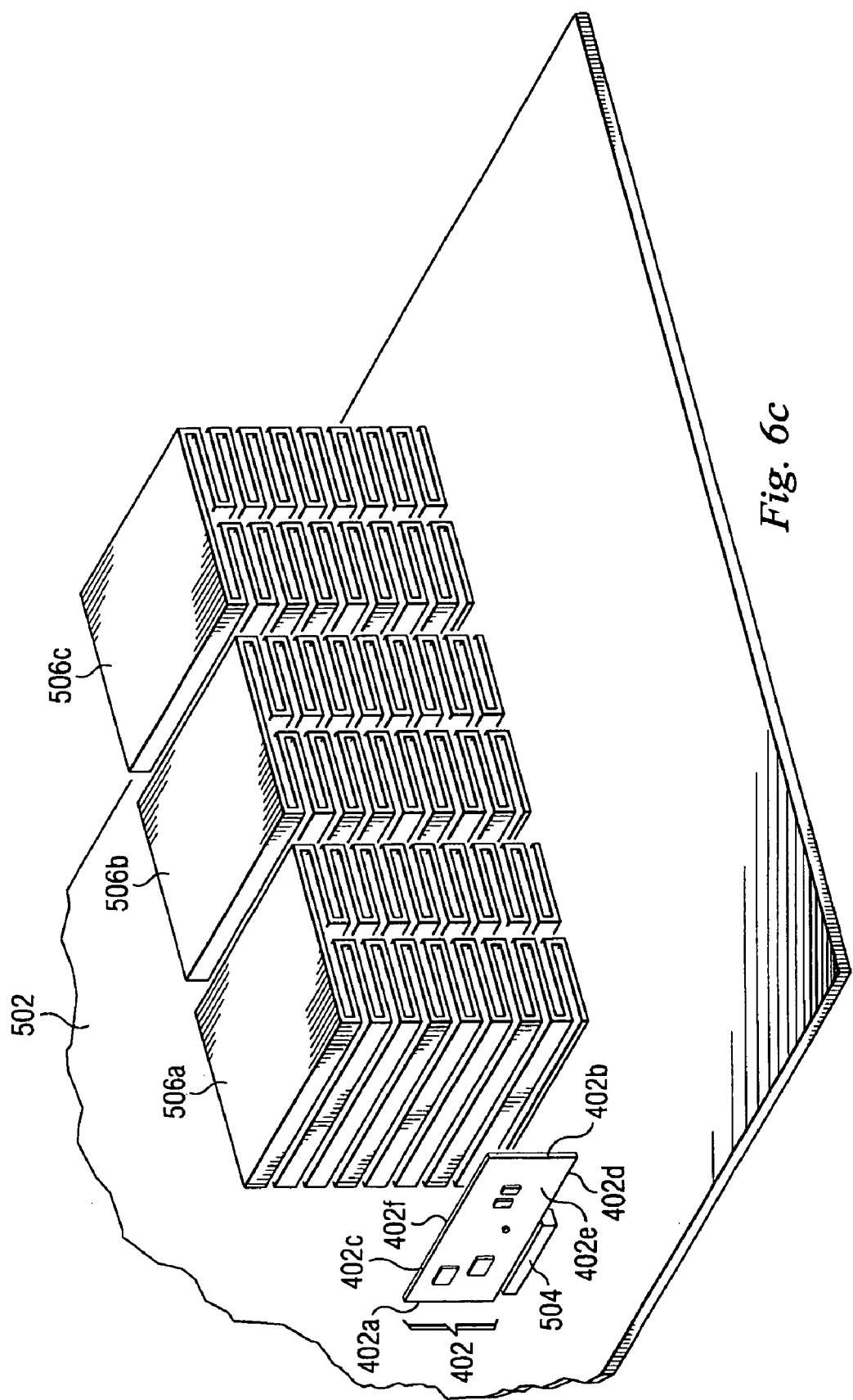
FIG. 6c is a perspective view illustrating an embodiment of the heat producing component of FIG. 4 coupled to the board of FIG. 5b.

Referring now to FIGS. 5b, 6a, and 6b, a method 600 for regulating airflow in a chassis is illustrated. The method 600 begins at step 602 where a chassis such as, for example, the chassis 116 described above with reference to FIG. 1, is provided. The chassis includes the board 500, illustrated in FIG. 5b, mounted to it. In an embodiment, the providing of a chassis in step 602 includes the coupling of the heat producing component 400 to the board 500. The heat producing component 400 is positioned above the heat producing component connector 504 such that the connector coupler 404 on heat producing component 400 is lined up with the connector slot 504a on the heat producing component connector 504, as illustrated in FIG. 6b. The heat producing component 400 is then moved in a direction B such that the connector coupler 404 matingly engages the the connector slot 504a on the heat producing component connector 504, as illustrated in FIG. 6c.

Figure 6E:
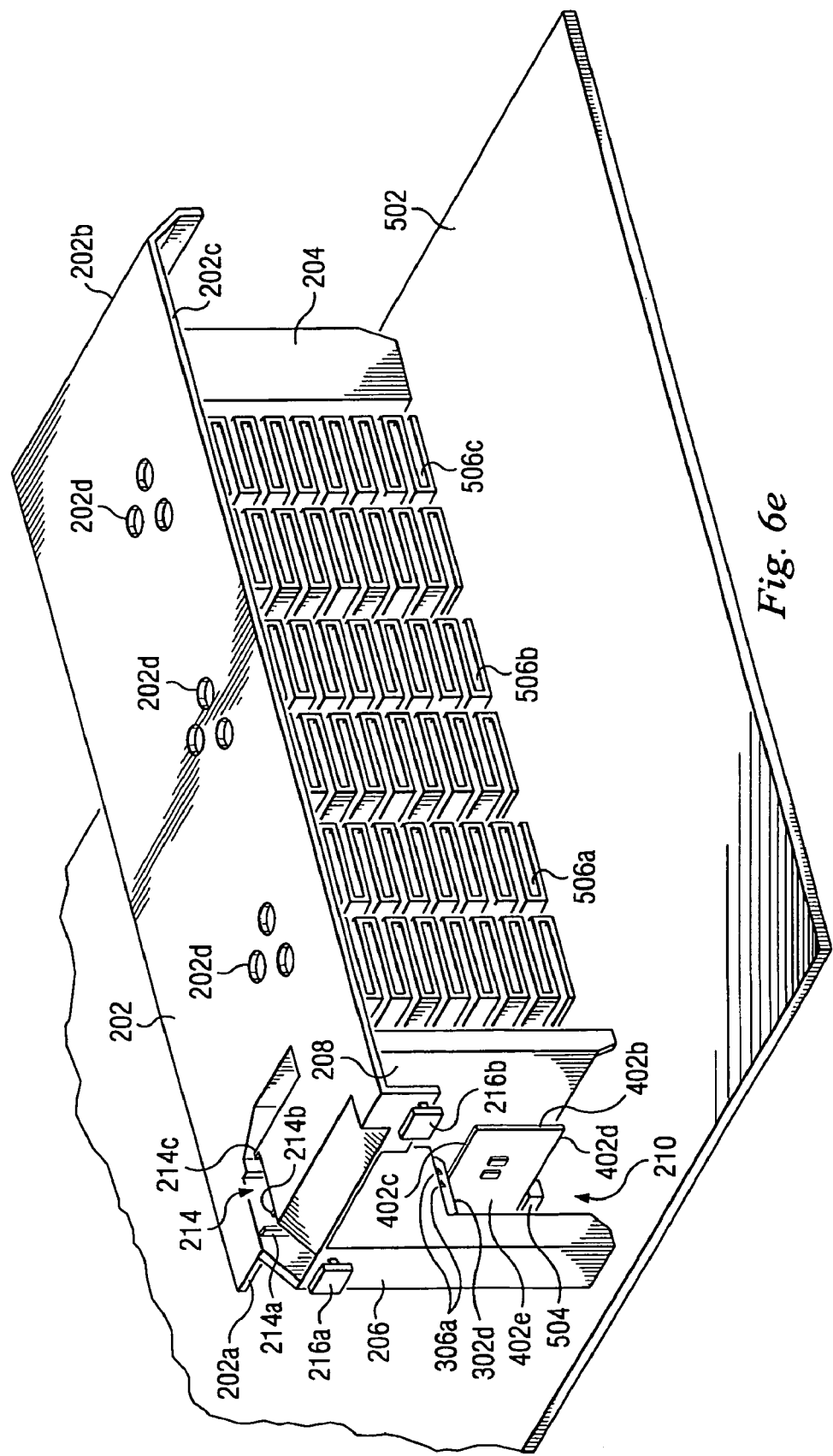
FIG. 6e is a perspective view illustrating an embodiment of the support frame and airflow regulator of FIG. 3d coupled to the board and heat producing of FIG. 6c.
Figure 6F:
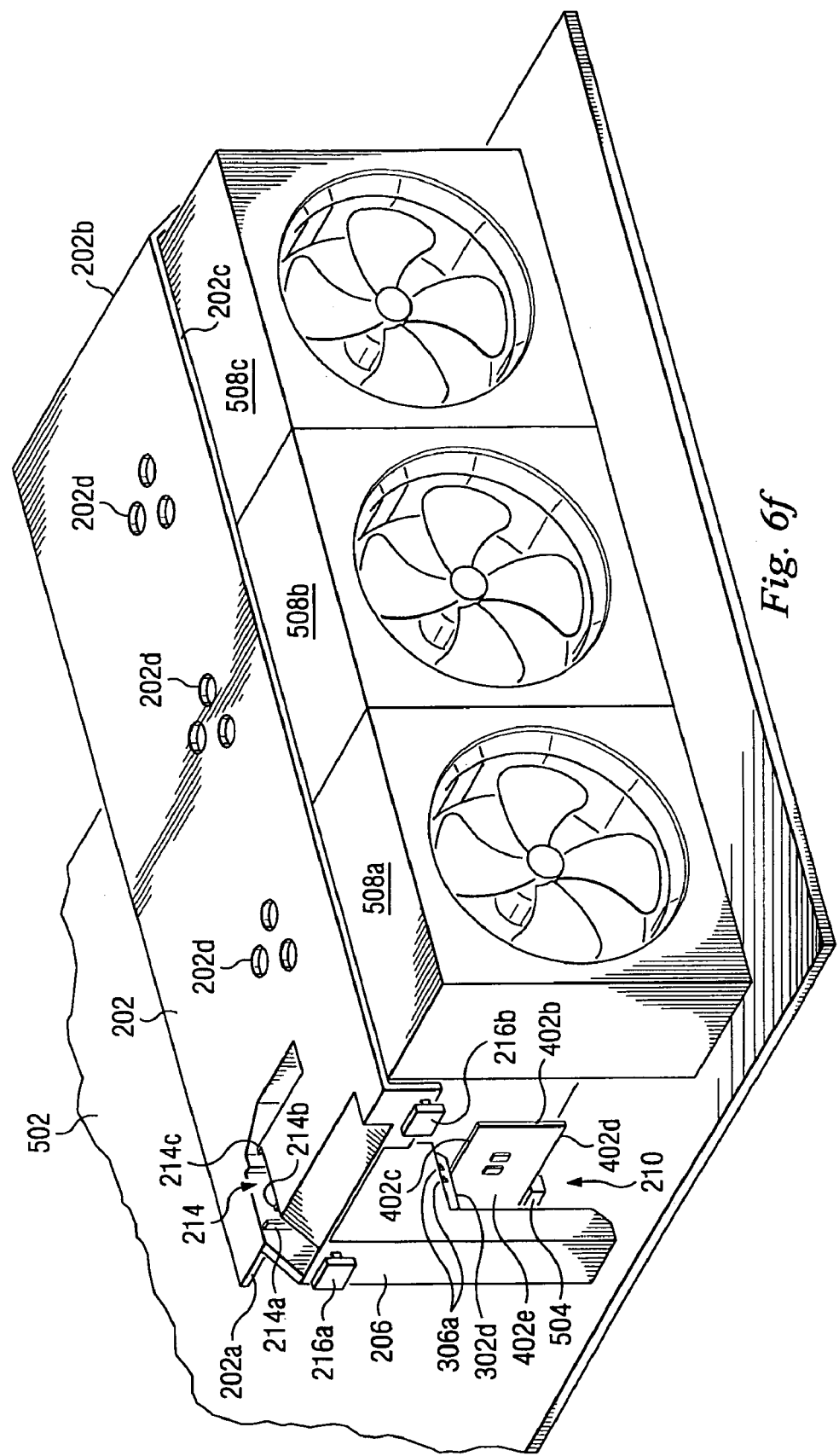
FIG. 6f is a perspective view illustrating an embodiment of the support frame and airflow regulator of FIG. 3d coupled to the board and heat producing of FIG. 6c with the fan modules illustrated.

Referring now to FIGS. 2a, 6a, 6d, and 6e, the method 600 proceeds to step 604 where the support frame 200 is coupled to the board 500 in the chassis. The support frame 200 is positioned above the board 500 such that leg 204 is adjacent heat dissipation component 506c; leg 206 is adjacent heat producing component 400; the heat dissipation components 506a, 506b, and 506c are adjacent the component channel 212; and the heat producing component 400 is adjacent the regulator channel 210 with the airflow regulator 300 biased into the regulator channel 210, as illustrated in FIG. 6d. In an embodiment, the support frame 200 may be coupled to a wall of the chassis. The support frame 200 is then moved in a direction C such that the heat dissipation components 506a, 506b, and 506c enter the component channel 212 on the support frame 200, and the top edge 402c of the heat producing component 400 engages the bottom edge 302d of the airflow regulator. Engagement of the heat producing component 400 with the airflow regulator 300 moves the airflow regulator 300 out of the regulator channel 210 and allows the heat producing component 400 to enter the regulator channel 210, as illustrated in FIG. 6e. The support frame 200 may then be held in place by, for example, coupling the support frame to the board 500 using conventional methods known in the art, and/or by coupling the chassis couplers 216a and 216b extending from side 202a of support frame 200 and the chassis couplers (not shown) extending from side 202b of the support frame 200 to securing features (not shown) on the chassis.

Referring now to FIGS. 2a, 6a, 6e, and 6f, the method 600 proceeds to step 606 where airflow is regulated through the chassis. With the support frame 200 coupled to the board 500, the fan modules 508a, 508b, and 508c engage the front edge of the support frame 200 such that any airflow from the fan modules 508a, 508b, and 508c goes through the support frame 200. When the fan modules 508a, 508b, and 508c are operated, airflow is allowed past the heat dissipation components 506a, 506b, and 506c positioned in the component channel 212 on support frame 200, as well as past the heat producing component 400 positioned in the regulator channel 210 on support frame, which results in cooling of the heat dissipation components 506a, 506b, and 506c and the heat producing component 400.

Referring now to FIGS. 5b and 6a, in an embodiment, the providing of a chassis in step 602 does not includes the coupling of the heat producing component 400 to the board 500 as described above with reference to FIGS. 6b and 6c.

Figure 6H:
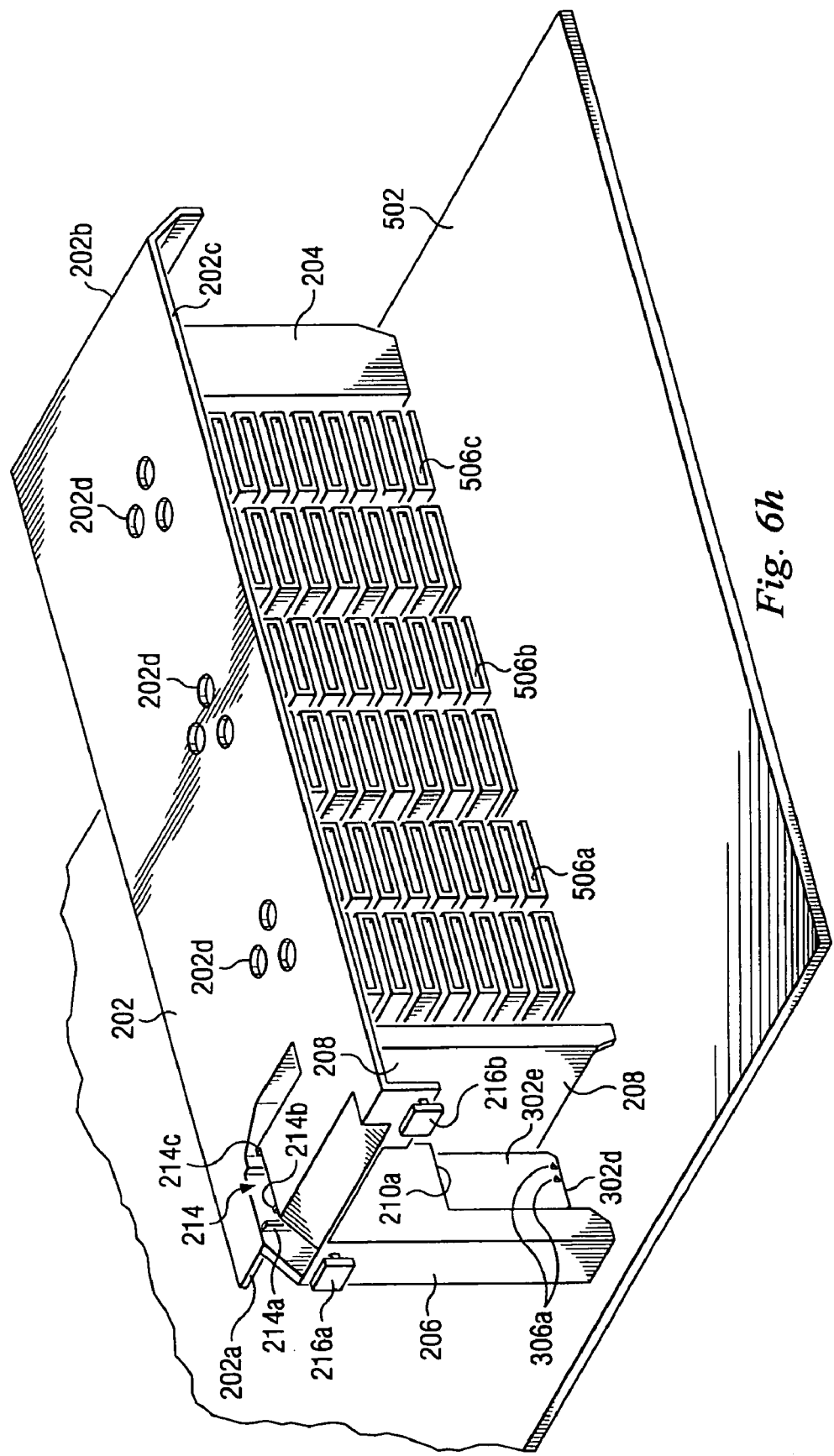
FIG. 6h is a perspective view illustrating an embodiment of the support frame and airflow regulator of FIG. 3d coupled to the board of FIG. 5b.
Figure 6I:
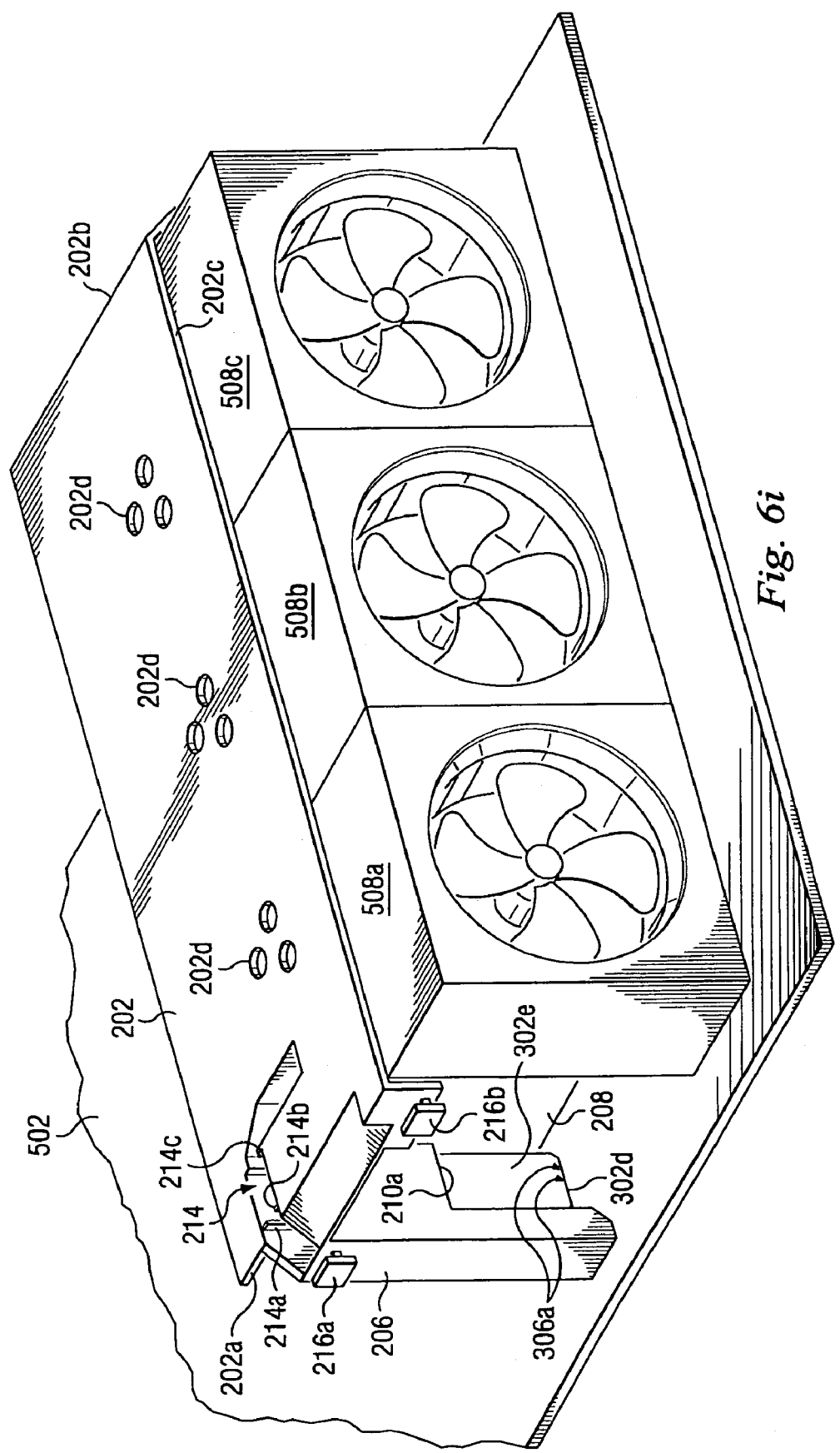
FIG. 6*i* is a perspective view illustrating an embodiment of the support frame and airflow regulator of FIG. 3*d* coupled to the board of FIG. 5*b* with the fan modules illustrated.

Referring now to FIGS. 2a, 6a, 6g, and 6h, the method 600 proceeds to step 604 where the support frame 200 is coupled to the board 500 in the chassis. The support frame 200 is positioned above the board 500 such that leg 204 is adjacent heat dissipation component 506c; leg 206 is adjacent heat producing component connector 504; the heat dissipation components 506a, 506b, and 506c are adjacent the component channel 212; and the heat producing component connector 504 is adjacent the regulator channel 210, with the airflow regulator 300 biased into the regulator channel 210, as illustrated in FIG. 6g. In an embodiment, the support frame 200 may be coupled to a wall of the chassis. The support frame 200 is then moved in a direction D such that the heat dissipation components 506a, 506b, and 506c enter the component channel 212 on the support frame 200, while the airflow regulator 300 remains in the regulator channel 210, as illustrated in FIG. 6h. The support frame 200 may then be held in place by, for example, coupling the support frame 200 to the board 500 using conventional methods known in the art, and/or by coupling the chassis couplers 216a and 216b extending from side 202a of support frame 200 and the chassis couplers (not shown) extending from side 202b of the support frame 200 to securing features (not shown) on the chassis.

Referring now to FIGS. 2a, 6a, 6h, and 6i, the method 600 proceeds to step 606 where airflow is regulated through the chassis. With the support frame 200 coupled to the board 500, the fan modules 508a, 508b, and 508c engage the front edge of the support frame 200 such that any airflow from the fan modules 508a, 508b, and 508c goes through the support frame 200. When the fan modules 508a, 508b, and 508c are operated, airflow is allowed through the heat dissipation components 506a, 506b, and 506c positioned in the component channel 212 on support frame 200, while the airflow regulator 300 prevents airflow through the regulator channel 210. In an embodiment, with the support frame 200 held in place, the airflow regulator 300 engages the base 502 of the board 500 between the heat producing component connector 504 and the fan modules 508a, 508b, and 508c in order to prevent airflow through the regulator channel 210. Thus, a method and apparatus are provided which regulate airflow through the chassis based on whether the heat producing component 400 is coupled to the board 500. The method and apparatus optimizes the airflow through the chassis by preventing airflow through the regulator channel 210 when there is no heat producing component 400 in the regulator channel 210. Furthermore, the method and apparatus require no manual configuration of the airflow regulator 300, but rather automatically adjust the position of the airflow regulator based on the decision of a user to couple or decouple a heat producing component 400 with the board 500.

Figure 7A:
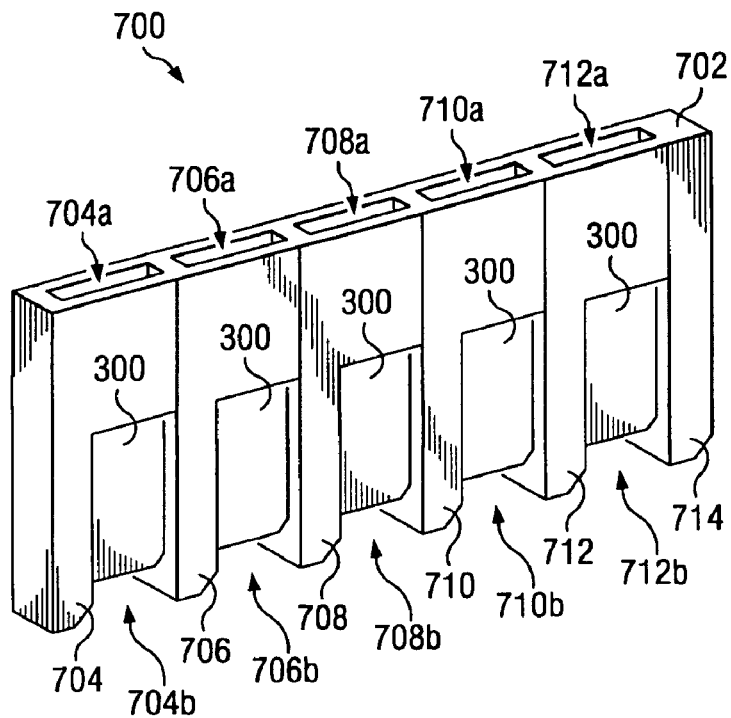
FIG. 7*a* is a perspective view illustrating an embodiment of a support frame.

Referring now to FIGS. 3a, 3b, and 7a, an embodiment of a support frame 700 is illustrated. Support frame 700 includes a base 702 have a plurality of legs 704, 706, 708, 710, 712, and 714 extending from the base 702. A plurality of regulator passageways 704a, 706a, 708a, 710a, 712a, and 714a are defined by the base 702 and the legs 704, 706, 708, 710, 712, and 714, respectively. A regulator channel 704b is defined by the leg 704, the base 702, and the leg 706. A regulator channel 706b is defined by the leg 706, the base 702, and the leg 708. A regulator channel 708b is defined by the leg 708, the base 702, and the leg 710. A regulator channel 710b is defined by the leg 710, the base 702, and the leg 712. A regulator channel 712b is defined by the leg 712, the base 702, and the leg 714. A plurality of airflow regulators 300 are coupled to the support frame 200 through respective regulator passageways 704a, 706a, 708a, 710a, 712a, and 714a and biased into respective regulators channels 704b, 706b, 708b, 710b, 712b, and 714b.

Figure 7B:
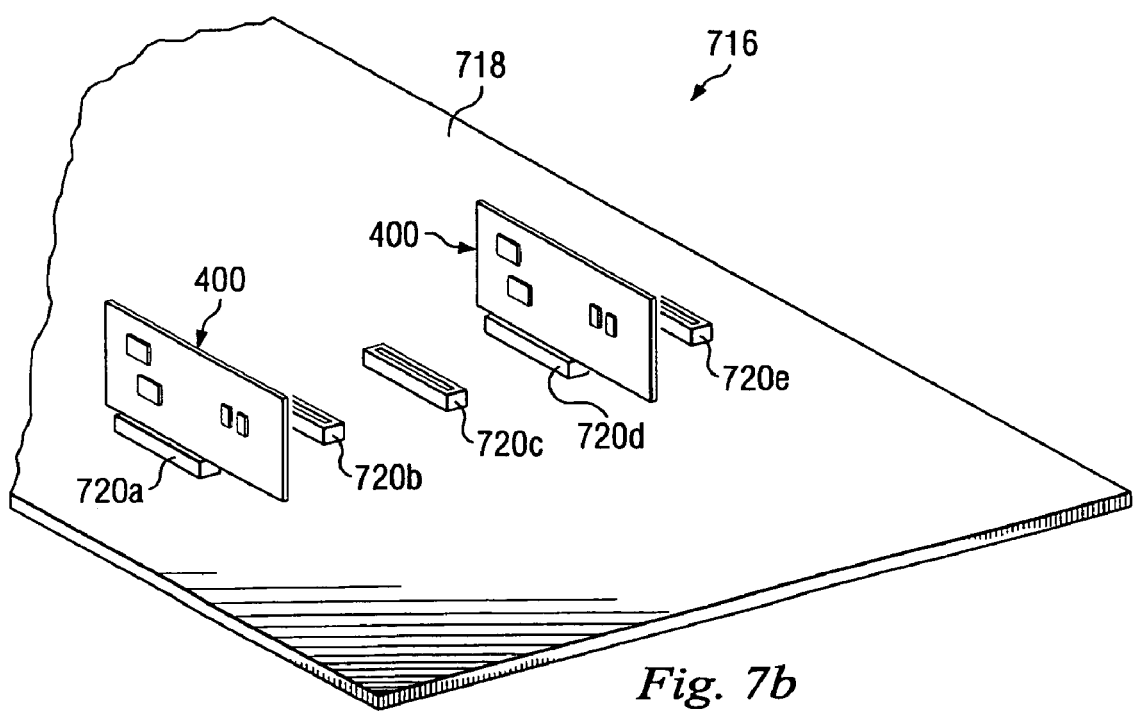
FIG. 7*b* is a perspective view illustrating an embodiment of a board including a plurality of the heat producing components of FIG. 4 and used with the support frame of FIG. 7*a*.

Referring now to FIGS. 4 and 7b, an embodiment of a board 716 is illustrated. Board 716 includes a base 718 having a plurality of heat producing component connectors 720a, 720b, 720c, 720d, and 720e mounted to the base 718. A heat producing component 400 is coupled to the heat producing component connector 720a and a heat producing component 400 is coupled to the heat producing component connector 720d in substantially the same manner as described above for coupling the heat producing component 400 to the heat producing component connector 504, illustrated in FIGS. 6b and 6c. The board 716 includes a plurality of fan modules coupled to the base 718 which are substantially similar in design and operation to the fan modules 508a, 508b, and 508c described above with respect to FIG. 5a, and which have been omitted for clarity.

Figure 7C:
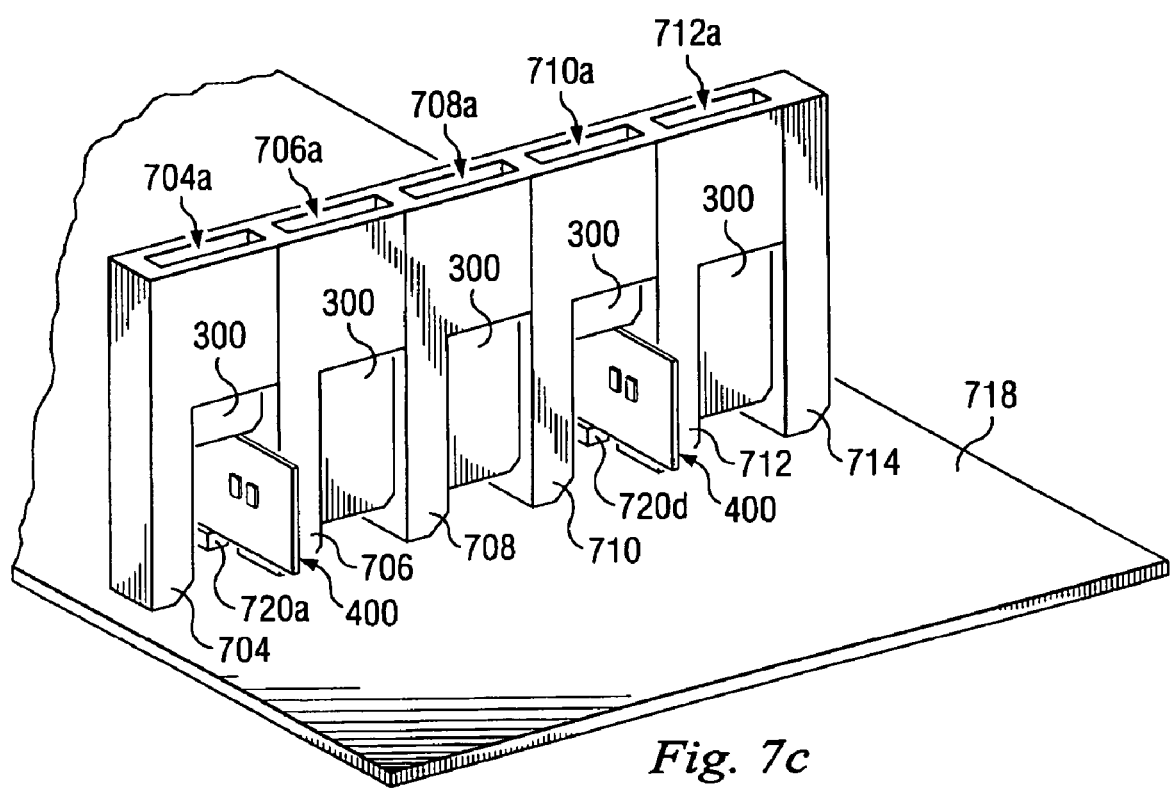
FIG. 7*c* is a perspective view illustrating the support frame of FIG. 7*a* coupled to the board of FIG. 7*b*.

Referring now to FIGS. 7a, 7b, and 7c, in operation, the support frame 700 is coupled to the board 716 in substantially the same manner as the support frame 200 is coupled to the board 500, described above with respect to FIGS. 6d and 6e. With the support frame 700 coupled to the board 716, the heat producing components 400 coupled to the heat producing component connectors 720a and 720d enter the regulator channels 704b and 710b by engaging the airflow regulators 300 in regulator channels 704b and 710b. When the fan modules are operated, airflow is allowed past the heat producing components 400 coupled to the heat producing component connectors 720a and 720d while the airflow regulators 300 in regulator channels 706b, 708b, and 712b prevent airflow through the regulator channels 706b, 708b, and 712b, optimizing the airflow through the heat producing components 400 coupled to the heat producing component connectors 720a and 720d.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An airflow regulating apparatus, comprising:
    a support frame coupled to a chassis adjacent a heat producing component connector, wherein the support frame defines a regulator channel such that a heat producing component coupled to the heat producing component connector will extend into the regulator channel;
    a fan adjacent the heat producing component connector; and
    an airflow regulator moveably coupled to the support frame and operable to be positioned in the regulator channel when there is no heat producing component coupled to the heat producing component connector such that airflow from the fan is regulated.

2. The apparatus of claim 1 wherein the airflow regulator is biased into the regulator channel by gravity.

3. The apparatus of claim 1 wherein the airflow regulator is biased into the regulator channel by a resilient member.

4. The apparatus of claim 1 wherein the airflow regulator is slideably coupled to the support frame.

5. The apparatus of claim 4 wherein the airflow regulator is operable to move relative to the support frame and vertically into the regulator channel.

6. The apparatus of claim 1 further comprising:
    a component channel defined by the support frame and positioned adjacent the regulator channel.

7. The apparatus of claim 1 further comprising:
    a plurality of heat release apertures defined by the support frame.

8. The apparatus of claim 1 further comprising:
    a plurality of regulator channels defined by the support frame, each regulator channel located adjacent a respective heat producing component connector such that a heat producing component coupled to any one of the heat producing component connectors will extend into the adjacent regulator channel; and
    a plurality of airflow regulators moveably coupled to the support frame and each operable to be positioned in a respective regulator channel when there is no heat producing component coupled to the adjacent heat producing component connector.

9. An information handling system comprising:
a chassis;
a board mounted in the chassis;
a fan coupled to the chassis for providing an airflow;
a microprocessor coupled to the board;
a heat producing component connector mounted to the board;
a support frame coupled to the board and defining a regulator channel which is positioned adjacent the heat producing component connector such that a heat producing component coupled to the heat producing component connector will extend into the regulator channel; and
an airflow regulator moveably coupled to the support frame and operable to be positioned in the regulator when there is no heat producing component coupled to the heat producing component connector such that the airflow from the fan is regulated.

10. The system of claim 9 wherein the airflow regulator is biased into the regulator channel by gravity.

11. The system of claim 9 wherein the airflow regulator is biased into the regulator channel by a resilient member.

12. The system of claim 9 wherein the airflow regulator is slideably coupled to the support frame.

13. The system of claim 9 further comprising:
a component channel defined by the support frame and positioned adjacent the regulator channel.

14. The system of claim 9 further comprising:
a plurality of heat release apertures defined by the support frame.

15. The system of claim 9 further comprising:
a plurality of regulator channels defined by the support frame, each regulator channel located adjacent a respective heat producing component connector such that a heat producing component coupled to any one of the heat producing component connectors will extend into the adjacent regulator channel; and
a plurality of airflow regulators moveably coupled to the support frame and each operable to be positioned in a respective regulator channel when there is no heat producing component coupled to the adjacent heat producing component connector.

16. The system of claim 9 wherein the support frame is coupled to the board and the airflow regulator is positioned in the regulator channel.

17. The system of claim 9 further comprising:
a heat producing component coupled to the heat producing component connector, whereby the support frame is coupled to the board and the heat producing component is positioned in the regulator channel and engaging the airflow regulator.

18. A method for regulating airflow in a chassis comprising:
providing a chassis including a fan coupled to the chassis, a board mounted to the chassis, and a heat producing component connector mounted to the board;
coupling a support frame to the board, the support frame defining a regulator channel located adjacent the heat producing component connector such that a heat producing component coupled to the heat producing component connector will extend into the regulator channel, the support frame also including an airflow regulator moveably coupled to the support frame and operable to be positioned in the regulator channel when there is no heat producing component coupled to the heat producing component connector; and
regulating the airflow from the fan with the airflow regulator.

19. The method of claim 18 further comprising:
coupling a heat producing component to the heat producing component connector, whereby the regulating includes the heat producing component being positioned in the regulator channel and engaging the airflow regulator as a result of coupling the support frame to the board.

20. The method of claim 18 wherein the regulating includes the airflow regulator being positioned in the regulator channel as a result of coupling the support frame to the board with no heat producing component coupled to the heat producing component connector.

21. An information handling system comprising:
a chassis;
a board mounted to the chassis;
a fan coupled to the chassis for providing an airflow;
a microprocessor coupled to the board;
a heat producing component connector mounted to the board;
a support frame coupled to the board and defining a regulator channel which is positioned adjacent the heat producing component connector;
an airflow regulator moveably coupled to the support frame and operable to be positioned in the regulator channel, whereby the airflow from the fan is regulated; and
a heat producing component coupled to the heat producing component connector, wherein the support frame is coupled to the board and the heat producing component is located in the regulator channel and engaging the airflow regulator.

22. A method for regulating airflow in a chassis comprising:
providing a chassis including a fan coupled to the chassis, a board mounted to the chassis, and a heat producing component connector mounted to the board;
coupling a heat producing component to the heat producing component connector;
coupling a support frame to the board, the support frame defining a regulator channel and including an airflow regulator moveably coupled to the support frame; and
regulating the airflow from the fan with the airflow regulator, whereby the regulating includes the heat producing component located in the regulator channel and engaging the airflow regulator as a result of coupling the support frame to the board.

* * * * *